United States Patent [19]
Fasano et al.

[11] Patent Number: 6,051,330
[45] Date of Patent: Apr. 18, 2000

[54] SOLID OXIDE FUEL CELL HAVING VIAS AND A COMPOSITE INTERCONNECT

[75] Inventors: Benjamin V. Fasano, New Windsor; Kevin M. Prettyman, Holmes, both of N.Y.

[73] Assignee: International Business Machines Corporation, Armonk, N.Y.

[21] Appl. No.: 09/007,891

[22] Filed: Jan. 15, 1998

[51] Int. Cl.[7] .............................. H01M 4/86; H01M 8/02
[52] U.S. Cl. ................................ 429/30; 429/32; 429/39; 264/44; 264/618; 29/623.4
[58] Field of Search ................... 429/30, 32, 38, 429/39; 264/29.6, 44, 468, 618; 29/623.3, 623.4, 623.5

[56] References Cited

U.S. PATENT DOCUMENTS

| | | | |
|---|---|---|---|
| 5,063,122 | 11/1991 | Rohr | 429/32 |
| 5,261,944 | 11/1993 | Lockhart et al. | 75/628 |
| 5,279,906 | 1/1994 | Yoshimura et al. | 429/30 |

FOREIGN PATENT DOCUMENTS

WO 93/17465  9/1993  WIPO .............................. H01M 8/04

OTHER PUBLICATIONS

"Cermet For Interconnection Of SOFC", Seto, et al., The Electrochemical Society Proceedings, vol. 93 (1993) pp. 421–427. (Month Unknown).

*Primary Examiner*—Stephen Kalafut
*Attorney, Agent, or Firm*—Ira D. Blecker

[57] ABSTRACT

One aspect of the invention relates to an interconnect for an SOFC wherein the interconnect is made from a cermet including partially stabilized tetragonal zirconia and a superalloy that is resistant to oxidizing and reducing conditions. Another aspect of the invention relates to an SOFC having vias for carrying fuel and an oxidant and at least one patterned feature in the anode, electrolyte, cathode and/or interconnect for laterally distributing the fuel or oxidant.

22 Claims, 4 Drawing Sheets

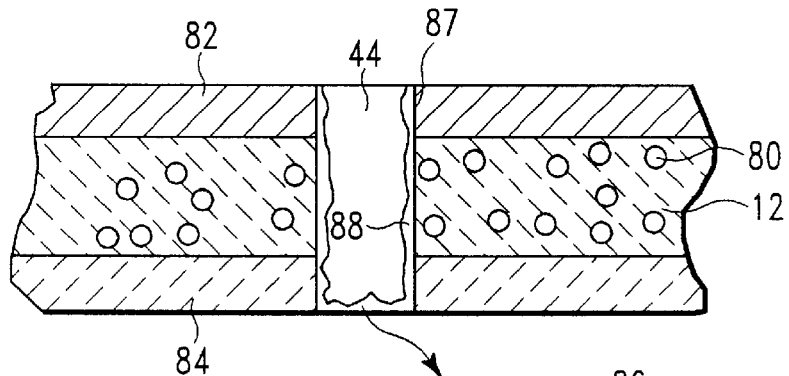
FIG. 7
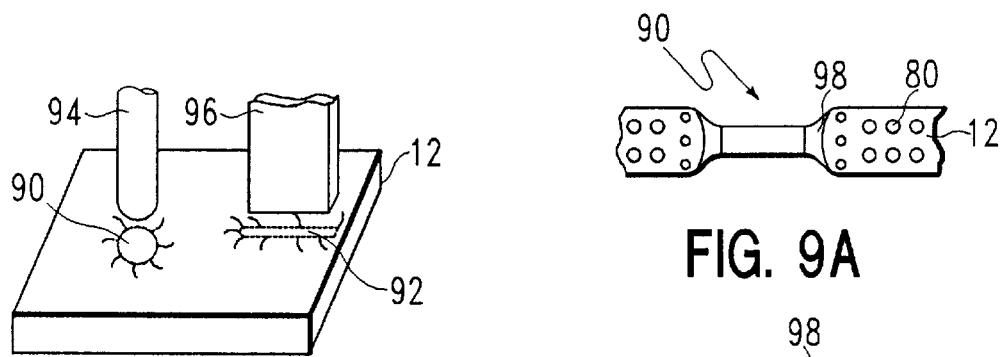
FIG. 8
FIG. 9A
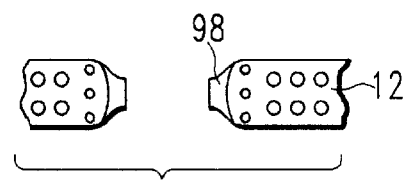
FIG. 9B
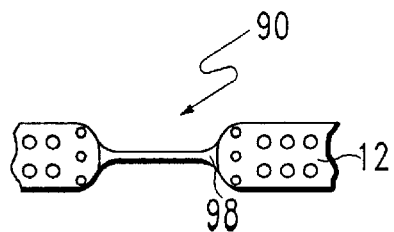
FIG. 10A
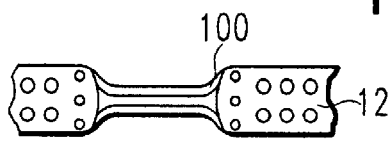
FIG. 10B
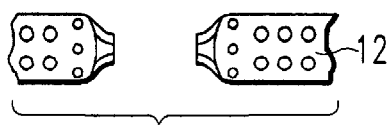
FIG. 10C

SOLID OXIDE FUEL CELL HAVING VIAS AND A COMPOSITE INTERCONNECT

BACKGROUND OF THE INVENTION

The present invention relates to the field of solid oxide fuel cells, and more particularly, relates to a solid oxide fuel cell having vias and an improved interconnect made from a metal/ceramic composite material.

A fuel cell is a device in which a first reactant, a fuel such as hydrogen or a hydrocarbon, is electrochemically reacted with a second reactant, an oxidant such as air or oxygen, to produce a DC electrical output. A fuel cell includes an anode, or fuel electrode, which enhances the rate at which electrochemical reactions occur on the fuel side. There is also a cathode, or oxidant electrode, which functions similarly on the oxidant side. In the solid oxide fuel cell (hereafter SOFC), a solid electrolyte, made of, for example, dense yttria-stabilized zirconica (YSZ) ceramic separates a porous ceramic anode from a porous ceramic cathode. The anode is made of, for example, nickelous oxide/YSZ cermet, and the cathode is made of, for example, doped lanthanum manganite.

In such an SOFC, the fuel flowing to the anode reacts with oxide ions to produce electrons and water, which is removed in the fuel flow stream. The oxygen reacts with the electrons on the cathode surface to form oxide ions that diffuse through the electrolyte to the anode. The electrons flow from the anode through an external circuit and thence to the cathode. The electrolyte is a nonmetallic ceramic that is a poor or nonconductor of electrons, ensuring that the electrons must pass through the external circuit to do useful work. However, the electrolyte permits the oxide ions to pass through from the cathode to the anode.

Each individual electrochemical cell, made of a single anode, a single electrolyte, and a single cathode, generates a relatively small voltage. To achieve higher voltages that are practically useful, the individual electrochemical cells are connected together in series to form a stack. The cells are connected in series electrically in the stack. The fuel cell stack includes an electrical interconnect between the cathode and the anode of adjacent cells. The fuel cell assembly also includes ducts or manifolding to conduct the fuel and oxidant into and out of the stack.

Numerous publications describe conventional SOFC which completely oxidize methane to carbon dioxide and water. These SOFC are not designed to conduct chemical processes, but rather to generate electricity from fuel gas and air (or oxygen). The processes conducted in SOFC are selected for complete combustion rather than partial combustion and require completion of an external electric circuit or oxidation of fuel gas for continuous operation.

The typical SOFC comprises an anode made of a mixture of nickel metal and YSZ and runs at 800–1000° C. since internal reforming is most efficient at these high temperatures. However, the trend in SOFC is to lower the operating temperature of the SOFC to 550–800° C. so that less exotic materials can be used for interconnects, electrical connections and materials of construction for the housing of the SOFC.

The ideal fuel for the anode is hydrogen but dangers of flammability, storage and energy storage density complicate its use. More commonly, the fuels used can be light hydrocarbons such as methane, propane, ethanol and methanol. Heavier fuels such as JP8 (jet fuel) and kerosene can also be used but in some cases the internal reforming is not efficient enough to reform the fuel and carbonaceous material is built up in the anode. Water vapor is typically added to the fuel source to aid reforming.

Various solutions have been proposed to improve the material properties of the interconnect. Seto et al., "CERMET FOR INTERCONNECTION OF SOFC", The Electrochemical Society Proceedings, vol. 93 (1993), the disclosure of which is incorporated by reference herein, discloses a cermet of 60 vol. % alumina and 40 vol. % Inconel 600 as an interconnect which has a thermal coefficient of expansion close to that of the zirconia electrolyte. However, the thermal coefficient of expansion of alumina is too high compared to zirconia.

Yoshimura et al. U.S. Pat. No. 5,279,906, the disclosure of which is incorporated by reference herein, discloses the flame spraying of nickel/chromium alloy powders plus alumina onto a carrier to make an interconnect. Only discrete layers can be made by this process.

Lockhart et al. U.S. Pat. No. 5,261,944, the disclosure of which is incorporated by reference herein, discloses a nickel/zirconia cermet for an anode. Nickel will tend to oxidize in oxidizing atmospheres leading to volumetric changes and consequent stress cracking.

Others have proposed SOFC arrangements having vias. Rohr U.S. Pat. No. 5,063,122, the disclosure of which is incorporated by reference herein, discloses an SOFC arrangement wherein the fuel and oxidant are distributed throughout the SOFC by vias. The disclosed SOFC requires multiple sintering operations to seal the distribution channel side walls and post-sintering machining to open the vias after sealing.

Meachem WO 93/17465, the disclosure of which is incorporated by reference herein, discloses discretely built layers which are then combined—not cofired.

Accordingly, it is a purpose of the present invention to have an improved SOFC having an interconnect with a cermet material.

It is a further purpose of the present invention to have an improved SOFC with vias for greater fuel and oxidant distribution efficiency.

It is yet another purpose of the present invention to have an improved process for the making of co-fired SOFC.

BRIEF SUMMARY OF THE INVENTION

One aspect of the invention relates to an SOFC comprising:
  a porous, ceramic anode;
  a dense, solid electrolyte adjacent to the porous, ceramic anode;
  a porous, ceramic cathode adjacent to the dense, solid electrolyte; and
  a dense, cermet interconnect adjacent to the porous, ceramic cathode, wherein the dense, cermet interconnect has nonintersecting passages for the flow of a fuel and an oxidant, said dense cermet interconnect comprising 45 to 75 volume percent partially stabilized tetragonal zirconia and 25 to 55 volume percent of a superalloy resistant to oxidizing and reducing atmospheres.

A second aspect of the invention relates to a method of making an SOFC, comprising the steps of:
  forming at least one layer of unsintered ceramic material, the ceramic material chosen for use as an anode of an SOFC;
  forming at least one layer of unsintered ceramic material, the ceramic material chosen for use as an electrolyte of an SOFC;

forming at least one layer of unsintered ceramic material, the ceramic material chosen for use as a cathode of an SOFC;

forming at least one layer of unsintered cermet material comprising 25 to 55 volume % of a superalloy that is resistant to oxidizing and reducing atmospheres and 45 to 75 volume % partially stabilized tetragonal zirconia, the cermet material chosen for use as an interconnect of an SOFC;

stacking and laminating the anode, electrolyte, cathode and interconnect layers into an SOFC unsintered laminate; and sintering the SOFC unsintered laminate in a neutral or reducing atmosphere to result in an SOFC.

A third aspect of the invention relates to an SOFC comprising:

a porous, ceramic anode having a first plurality of vias penetrating the porous, ceramic anode for carrying a fuel and a second plurality of vias penetrating the porous, ceramic anode for carrying an oxidant, the first plurality of vias allowing the fuel to infiltrate the porous, ceramic anode while the second plurality of vias being sealed so that the oxidant does not infiltrate the porous, ceramic anode;

a dense, solid electrolyte adjacent to the porous, ceramic anode and having a first plurality of vias penetrating the dense, solid electrolyte for carrying a fuel and a second plurality of vias penetrating the dense, solid electrolyte for carrying an oxidant, the dense, solid electrolyte being gas-tight;

a porous, ceramic cathode adjacent to the dense, solid electrolyte and having a first plurality of vias penetrating the porous, ceramic cathode for carrying a fuel and a second plurality of vias penetrating the porous, ceramic cathode for carrying an oxidant, the second plurality of vias allowing the oxidant to infiltrate the porous, ceramic cathode while the first plurality of vias being sealed so that the fuel does not infiltrate the porous, ceramic cathode; and a dense, ceramic interconnect adjacent to the porous, ceramic cathode and having a first plurality of vias penetrating the dense, ceramic interconnect for carrying a fuel and a second plurality of vias penetrating the dense, ceramic interconnect for carrying an oxidant, the dense, ceramic interconnect being gas-tight; and at least one patterned feature on at least one of the porous, ceramic anode; dense, ceramic electrolyte; porous, ceramic cathode and dense, ceramic interconnect for distributing the fuel or oxidant;

wherein the first and second plurality of vias in each of the porous, ceramic anode; dense, solid electrolyte; porous, ceramic cathode; and dense, ceramic interconnect, and the at least one patterned feature cooperate to form separate fuel and oxidant passageways through the SOFC.

A last aspect of the invention relates to a method of making an SOFC, comprising the steps of:

forming at least one layer of unsintered ceramic material, the ceramic material chosen for use as an anode of an SOFC;

punching a first plurality of through holes in the unsintered layer of anode material;

embossing the unsintered layer of anode material at predetermined locations and then punching at the predetermined locations to form a second plurality of through holes;

forming at least one layer of unsintered ceramic material, the ceramic material chosen for use as an electrolyte of an SOFC;

punching first and second plurality of through holes in the unsintered layer of electrolyte material;

forming at least one layer of unsintered ceramic material, the ceramic material chosen for use as a cathode of an SOFC; embossing the unsintered layer of cathode material at predetermined locations and then punching at the predetermined locations to form a first plurality of through holes;

punching a second plurality of through holes in the unsintered layer of cathode material;

forming at least one layer of unsintered ceramic material, the ceramic material chosen for use as an interconnect of an SOFC;

punching first and second plurality of through holes in the unsintered layer of interconnect material;

stacking and laminating the anode, electrolyte, cathode and interconnect layers into an SOFC unsintered laminate wherein the first plurality of through holes and second plurality of through holes, respectively, in the anode, electrolyte, cathode and interconnect layers cooperate to form passageways; and sintering the SOFC unsintered laminate in a neutral or reducing atmosphere to result in an SOFC.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

FIG. 7 is a cross-sectional view of an unsintered layer of an SOFC showing one method of sealing the sidewall of a through hole.

FIG. 8 is a perspective view showing the embossing of an unsintered layer of an SOFC.

FIG. 9A is a cross-sectional view of the embossed layer of FIG. 8 and FIG. 9B shows this layer with a through hole.

FIG. 10A is a cross-sectional view of the embossed layer of FIG. 8, FIG. 10B shows the embossed area being covered with additional greensheet material and FIG. 10C shows this layer with a through hole.

DETAILED DESCRIPTION OF THE INVENTION

Figure 1:
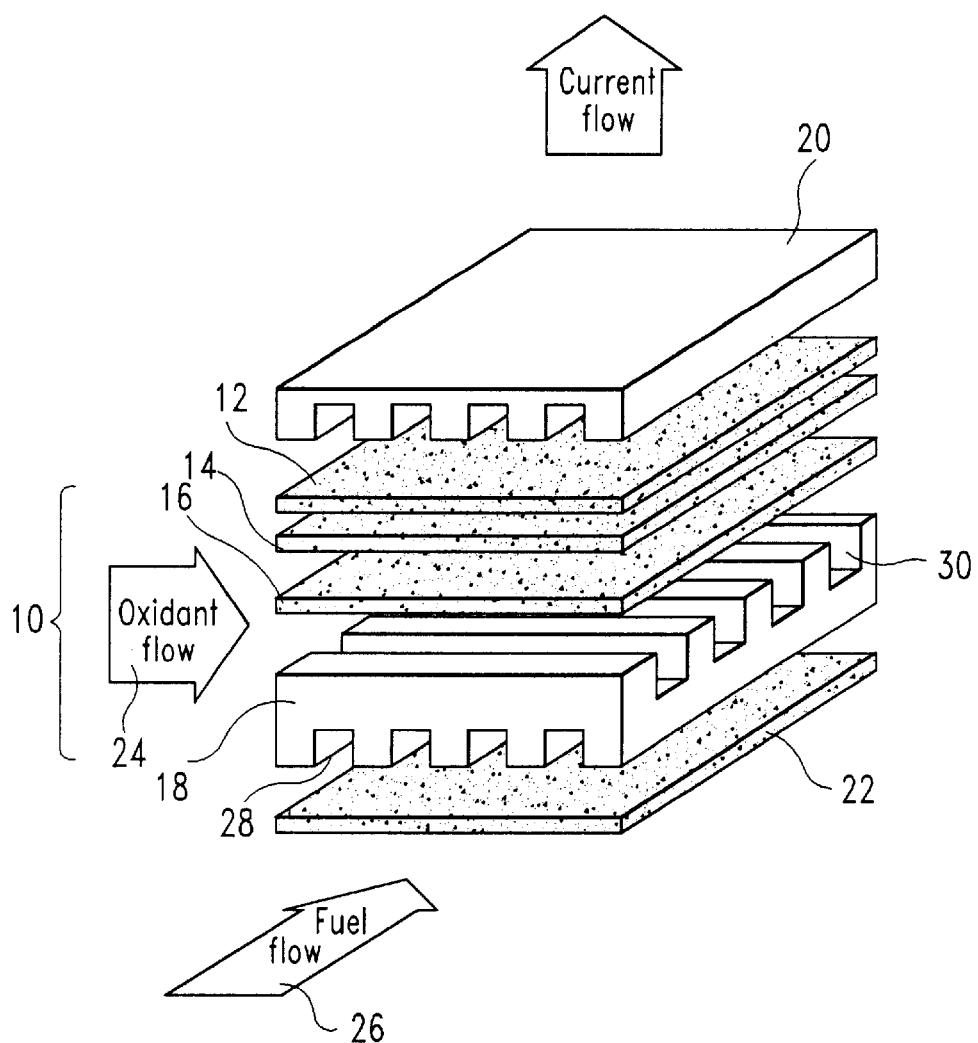
FIG. 1 is a perspective exploded view of a first embodiment of an SOFC.

Referring to the Figures in more detail, and particularly referring to FIG. 1, there is disclosed a first embodiment of an SOFC 10, which consists of anode 12, solid electrolyte 14, cathode 16 and interconnect 18. These four elements make up the basic SOFC. Additional SOFC can be stacked above and below SOFC 10 to provide a SOFC assembly. Thus, adjacent to interconnect 18 is anode 22 which begins the next SOFC. As SOFC 10 is the last in the stack of SOFC, adjacent to anode 12 is end plate 20 instead of another interconnect.

Anode 12 and cathode 16 are porous. The size and volume percent of porosity of the anode 12 and cathode 16 can be chosen to meet the design objectives of the SOFC assembly. Solid electrolyte 14 and interconnect 18 are dense, that is, having only a limited amount of porosity (i.e., having no more than about 5 volume percent porosity) so that gas flow cannot proceed through the solid electrolyte 14 or interconnect 18. Electrical connections between the anode 12 and cathode 16, which normally carry the current flow, are omitted for clarity.

Interconnect 18 has passages for the flow of fuel, oxidant and reaction products. As shown in FIG. 1, passages 28 are arranged for the fuel flow 26 while passages 30 are arranged for the oxidant flow 24. For the present design of the interconnect 18, fuel flow passages 28 and oxidant flow passages 30 are orthogonal to each other but they are not intersecting. For safe and efficient operation of the SOFC, it is necessary to separate the fuel flow 26 from the oxidant flow 24.

The materials of the anode 12, solid electrolyte 14 and cathode 16 may be chosen from any of the many suitable ceramic materials available for SOFC. Some of these materials include yttria-stabilized tetragonal zirconia or partially stabilized, yttria doped tetragonal zirconia for the anode; perovskites for the cathode; and fully stabilized yttria doped, cubic zirconia for the electrolyte.

The material for the interconnect 18, according to the present invention, is a cermet comprising any number of so called "superalloys" able to withstand high temperatures in air (an example of which is Inconel 600) and partially stabilized tetragonal zirconia. The composite material could be a metal matrix infiltrated with ceramic (zirconia) or tetragonal zirconia matrix infiltrated with the metal, with the metal loading being above the theoretical percolation limit (around 40%) in order to insure electrical conductivity. This decreases resistivity of the interconnect over state of the art interconnects by orders of magnitude. It also better matches the thermal coefficient of expansion (TCE) of the rest of the SOFC layers ($100-110 \times 10^{-7}/°$ C.), thereby preventing cracking at the interconnect interfaces during heat up or cool down. The metals proposed (Inconels, for example) have TCE's ranging from $100 \times 10^{-7}/°$ C. at room temperature to $160 \times 10^{-7}/°$ C. at 800° C. If zirconia is combined with the metal, the TCE could be made to match that of the other layers (about $100 \times 10^{-7}/°$ C. at room temperature) throughout the required temperature range. Ideally, the percent ceramic in the composite is as high as possible, without inhibiting electrical conductivity. Typically, this would be 45 to 75 volume percent ceramic.

Inconel 600 is only given here as an example of a useable embodiment, being composed of nickel, chromium and iron. It has been designed for resistance to corrosion at elevated temperatures both in reducing and oxidizing atmospheres. However, the invention is broad enough to encompass other Inconel alloys that are resistant to corrosion at elevated temperatures. This is critical in the interconnect layer, since it sees both atmospheres at either of its faces. Inconel 600 also has excellent mechanical properties at elevated temperatures and has been used above 1100° C. It also has favorable high temperature creep properties. Many of the nickel cobalt alloys could also be used.

The fuel cell of the present invention can be made with multilayer ceramic technology which allows for the tailoring of the composition and porosity of the components of the SOFC.

Appropriate ceramic and/or metal powders would be chosen for each of the components of the SOFC. Binders, solvents, plasticizers, rheological control agents and the powder would be ball milled for a sufficient time to mix the various ingredients. The mixture would then be tape cast in layers having a thickness of 1 to 30 mils. Thereafter, the tape layer would be blanked to form the individual layers (called greensheets) of each of the components of the SOFC. Those layers that form the interconnect 18 would be patterned to form passages 28, 30.

Once the layers are formed as above, they are stacked and laminated to form an SOFC laminate. Depending on the thickness of the individual layers and the size of the SOFC, there may be several layers that make up each component of the SOFC. Several SOFC are usually stacked and laminated together to form an SOFC stack.

The SOFC stack laminate is then sintered in an appropriate atmosphere to result in the SOFC stack. Preferably, a neutral or reducing atmosphere is utilized. A typical sintering cycle could include ramping up to a temperature where densification does not occur (for example, about 600–700 degrees Centigrade for many ceramics) in a slightly oxidizing temperature to pyrolyze and burn-off the binder material followed by densification at a much higher temperature (for example, 1000–1500 degrees Centigrade) in a neutral or reducing atmosphere.

Figure 2:
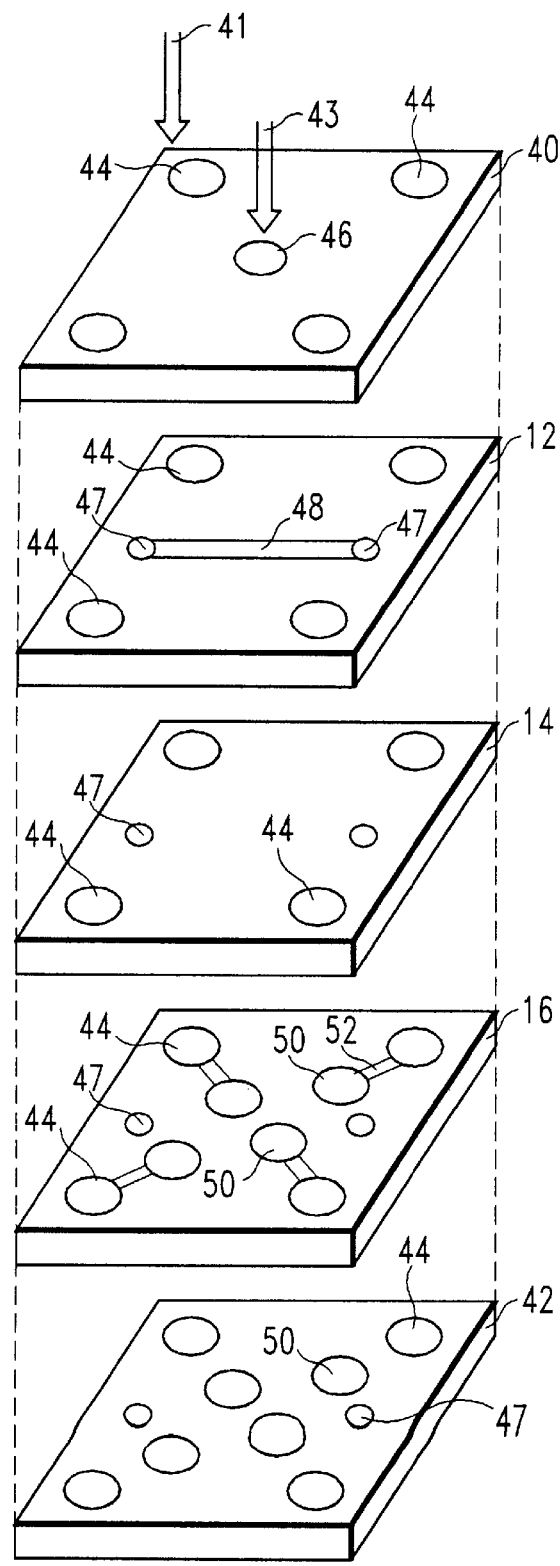
FIG. 2 is a perspective exploded view of an unsintered, second embodiment of an SOFC.

Referring now to FIG. 2, there is disclosed a second embodiment of an SOFC 10'. In this embodiment, however, the individual layers of the SOFC 10' have through holes for the passage of fuel and oxidant. As shown in FIG. 2, all of the layers are in the unsintered condition. Layer 40 is at the top of the SOFC stack and contains through holes 44 for the passage of the oxidant 41 while through hole 46 is for the passage of fuel 43. Usually there will be a plurality of such through holes 46. Also, there will be more through holes 44 for the passage of oxidant than through holes 46 for the passage of fuel. In the pattern shown in layer 40 of FIG. 2, the through holes 44 are at the corners of a square while through hole 46 is in the center of the square. This pattern is for illustration purposes only. In practice, the actual pattern may differ. Since it is necessary that the fuel and oxidant do not infiltrate the layer 40, layer 40 is made dense and gas-tight so that the fuel and oxidant do not infiltrate the layer 40.

Anode layer 12 is the first layer of SOFC 10' and contains through holes 44 for the passage of oxidant and through holes 47 for the passage of fuel. In addition, anode layer 12 contains channel 48 for the distribution of fuel. It should be noted that the position of through holes 47 in anode layer 12 is different than the position of through hole 46 in layer 40. Channel 48 allows for the repositioning of flow of gases from the single through hole 46 to two (or more) through holes 47. It is necessary that oxidant not infiltrate anode layer 12 so the sidewalls of through holes 44, which conduct oxidant, are sealed by a method to be discussed hereafter. The sidewalls of through holes 47 are not sealed since it is desired to have the fuel infiltrate anode layer 12 through porosity in the anode layer 12 as well as through channel 48. Channel 48 improves the lateral distribution of the fuel through the anode layer 12.

Electrolyte layer 14 contains both through holes 44 and through holes 47. Again, since electrolyte layer 14 is dense and gas-tight, the fuel and oxidant do not penetrate the electrolyte layer 14.

Cathode layer 16 contains through holes 44 and through holes 47. In addition, cathode layer 16 contains distribution channels 52 and additional oxidant through holes 50. The sidewalls of through holes 47 are sealed to prevent the escape of fuel into cathode layer 16 while the sidewalls of through holes 44 and 50 are not sealed. Distribution channels 52 allow more efficient lateral distribution of the oxidant rather than just through the porosity inherent in cathode layer 16.

Lastly, interconnect layer 42 contains through holes 47 for the passage of fuel and through holes 44, 50 for the passage of oxidant. Interconnect layer 42 is dense and gas-tight to prevent the escape and intermixing of the fuel 43 and oxidant 41.

The respective through holes from layer to layer in cooperation with their respective channels must be in alignment to form conduits for the passage of fuel and oxidant. That is, through holes 44 in top layer 40 must align with through holes 44 in anode layer 12 which must align with through holes 44 in solid electrolyte layer 14 and so on. The same holds true for the fuel through holes and channels. For example, through hole 46 in top layer 40 must align with channel 48 in anode layer 12 (and repositioned to through holes 47 in anode layer 12) which must align with through holes 47 in solid electrolyte layer 14 and so on.

Figure 3:
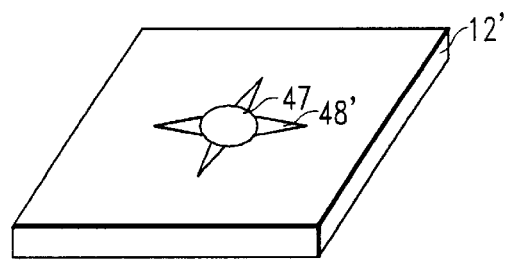
FIG. 3 is a perspective view of an unsintered layer of the second embodiment of the SOFC showing a distribution channel.
Figure 4:
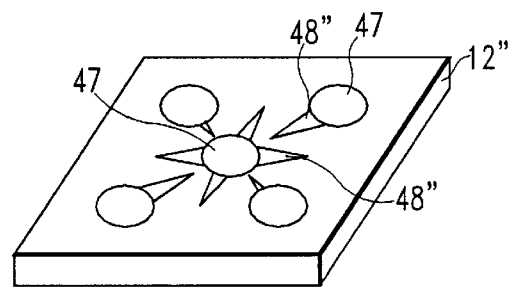
FIG. 4 is a perspective view of an unsintered layer of the second embodiment of the SOFC showing another type of distribution channel.

The distribution channels 48 and 52 shown in FIG. 2 may be varied to fit the particular application and there may be a plurality of such channels 48, 52 in any given layer. A variation of the anode layer 12 in FIG. 2 is shown in FIGS. 3 and 4 as anode layer 12' and 12", respectively. Anode layer 12' has through hole 47 with distribution channels 48' radiating outwardly. Anode layer 12" has through hole 47 with distribution channels 48" radiating outwardly.

Figure 5:
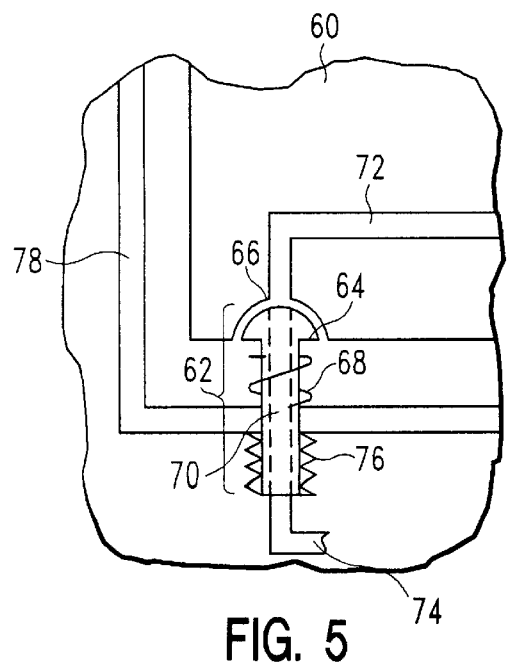
FIG. 5 is a first embodiment of an apparatus for sealing the SOFC.

Shown in FIG. 5 is an apparatus for connecting a gas (fuel or oxidant) inlet or outlet to the SOFC stack 60 which is made up of a plurality of SOFC cells 10'. It is necessary to bring fuel and oxidant into the SOFC stack 60 and remove it. Connection to SOFC stack 60 is made by ball and socket 62. Ball 64 mates with socket 66. Spring 68 keeps ball 64 firmly in contact with socket 66. Ball 64 has an interior passage 70 which aligns with interior gas passage 72 of the SOFC stack 60 and exterior gas line 74. Seal 76, typically a bellows design, seals ball 64 in wall 78 of the SOFC housing. Since ball 64 and spring 68 will be operating at relatively high temperatures, it is necessary that these parts be made from a heat resistant material such as silicon nitride.

Whereas an electrical connection needs to be made to the SOFC stack 60 to allow the stack to provide electricity, the ball and socket connection can be used to make the electrical connection through the wall 78 of the SOFC housing. Electrically conductive refractory metals, ceramics and cermets would be used to fashion the ball and socket connector devices. An electrically insulating sleeve or bushing could be used to isolate the ball and socket connector from the housing, if needed.

Figure 6:
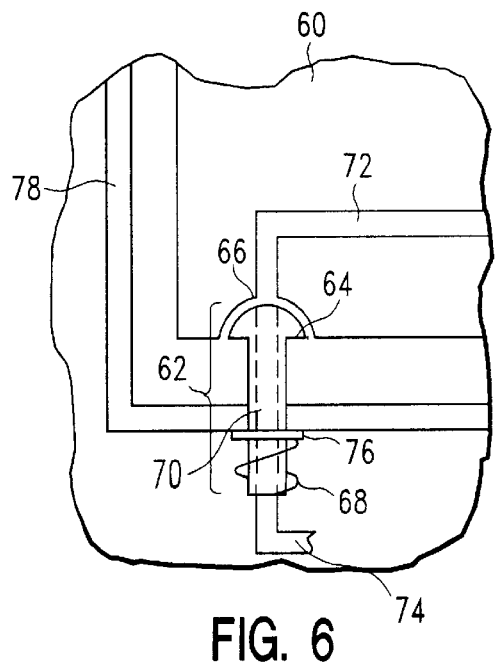
FIG. 6 is a second embodiment of an apparatus for sealing the SOFC.

Referring now to FIG. 6, there is shown a modification of the connection apparatus shown in FIG. 5. The connection apparatus shown in FIG. 6 is similar to that shown in FIG. 5 except that now spring 68 is located outside of wall 78 in the SOFC housing.

The distinct advantage of using the connectors shown in FIGS. 5 and 6 is their ability to accommodate a socketable SOFC stack without hard braze or glass sealing connections. This provides flexibility in changing SOFC stacks after their efficiency drops or due to defects. The compliant design of the springs allows greater tolerance of thermal expansion dimensional changes that occur during heating and cooling of the SOFC stack during startup and cooldown. This allows for replacement of defective stacks at end user locations with relative ease (i.e., field replaceable units).

The SOFC shown in FIG. 2 is made by the multilayer ceramic technology referenced above. The materials chosen for the anode layer 12, electrolyte layer 14 and cathode layer 16 may be the same as those mentioned above. The materials for the top layer 40 and interconnect layer 42 may be selected from traditional lanthanum and/or chromium based ceramics or the cermets proposed here and described previously.

According to this embodiment of the invention however, the individual layers have through holes formed therein for the passage of fuel and oxidant. As noted above, some of the holes will allow the gas (fuel or oxidant, as the case may be) to infiltrate the porosity of the layer. In this case, the through holes will be merely punched in the unsintered layers by known punching techniques. Conversely, the sidewall of some of the holes will be sealed to prevent the gas (fuel or oxidant, as the case may be) from laterally infiltrating the porosity of the layer. The various methods of sealing the through holes will be discussed shortly.

Top layer 40, electrolyte layer 14 and interconnect layer 42, being dense and gas-tight, do not need to have their through hole sidewalls sealed. However, if these layers were not gas-tight, then their through hole sidewalls may be sealed according to the teachings of the present invention.

The methods for sealing the through hole sidewalls will now be discussed. Referring now to FIG. 7, anode layer 12 is shown for illustration purposes having a through hole 44 (for example) punched therein. Anode layer 12 has porosity 80, which is desirable for the infiltration of fuel but undesirable when oxidant is conducted through the through holes 44. Thus, it is desirable to seal the sidewalls 87 of through hole 44. Punched anode layer 12 is placed between mask 82 and backing sheet 84 and a paste 88 is screened or sprayed into through hole 44. A vacuum 86 is then pulled from the backing sheet 84 to cause paste 88 to be sucked into the through hole 44 and coat the sidewalls 87 of the through hole 44. Mask 80 and backing sheet 84 are then removed. During sintering, paste 88 densities and seals the sidewalls 87 of through hole 44. Paste 88 can, for instance, be made from the same powders as anode layer 12 or a finer particle size can be used. Alternatively, a sintering aid can be combined with the powder to improve the densification of the via sidewall.

Another method of sealing the through hole sidewalls is demonstrated with reference to FIGS. 8, 9A and 9B. In FIG. 8, anode layer 12 (for example) has areas 90, 92 embossed with embossing tools 94, 96. Embossing as used in the present invention means to press on the unsintered layer so as to cause compression and densification of the unsintered layer, thereby leaving an impression. It is known that such embossing results in an area that is more densely sintered, thus essentially excluding porosity. Embossing tool 94 is round so as to leave a round embossed area 90 while embossing tool 96 is elongated so as to leave an elongated area 92. Other configurations of the embossing tools are within the scope of the present invention. Embossed area 90 will be where a through hole is located while embossed area 92 is where a channel will be located. A cross section of embossed area 90 is shown in FIG. 9A with dense area 98 and porosity 80. The embossed area 90 is then punched to result in a through hole having a wall of dense area 98, which sinters to a high density and seals the through hole.

A last method of forming a sealed through hole sidewall is shown in FIGS. 10A, 10B and 10C. FIG. 10A again shows embossed area 90. After embossing, a further layer 100 of unsintered anode material is deposited by, for instance, screening a paste comprising the anode powder into the embossed area 90. Thereafter, the embossed area 90 is punched to result in a through hole. Upon sintering, this embossed region and the sidewall of the through hole will sinter to a high density, thereby sealing the through hole sidewall.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. An SOFC comprising:
    a porous, ceramic anode;
    a solid electrolyte adjacent to the porous, ceramic anode, the solid electrolyte having no more than about 5 volume percent porosity;
    a porous, ceramic cathode adjacent to the dense, solid electrolyte; and
    a cermet interconnect adjacent to the porous, ceramic cathode, wherein the cermet interconnect has nonintersecting passages for the flow of a fuel and an oxidant, said cermet interconnect comprising 45 to 75 volume percent partially stabilized tetragonal zirconia and 25 to 55 volume percent of a superalloy resistant to oxidizing and reducing atmospheres, and said cermet interconnect having no more than about 5 volume percent porosity.

2. The SOFC of claim 1 wherein the superalloy is an Inconel.

3. The SOFC of claim 2 wherein the superalloy is Inconel 600.

4. The SOFC of claim 1 wherein the ceramic material of the anode is yttria-stabilized zirconia.

5. The SOFC of claim 4 wherein the ceramic anode further comprises Ni or NiO.

6. The SOFC of claim 1 wherein the ceramic material of the anode is partially stabilized, yttria-doped tetragonal zirconia.

7. The SOFC of claim 6 wherein the ceramic anode further comprises Ni or NiO.

8. A method of making an SOFC, comprising the steps of:
    forming at least one layer of unsintered ceramic material, the ceramic material chosen for use as an anode of an SOFC;
    forming at least one layer of unsintered ceramic material, the ceramic material chosen for use as an electrolyte of an SOFC;
    forming at least one layer of unsintered ceramic material, the ceramic material chosen for use as an cathode of an SOFC;
    forming at least one layer of unsintered cermet material comprising 25 to 55 volume % of a superalloy that is resistant to oxidizing and reducing atmospheres and 45 to 75 volume % partially stabilized tetragonal zirconia, the cermet material chosen for use as an interconnect of an SOFC;
    stacking and laminating the anode, electrolyte, cathode and interconnect layers into an SOFC unsintered laminate; and
    sintering the SOFC unsintered laminate in a neutral or reducing atmosphere to result in an SOFC.

9. The method of claim 8 wherein the superalloy is an Inconel.

10. The method of claim 9 wherein the superalloy is Inconel 600.

11. An SOFC comprising:
    a porous, ceramic anode having a first plurality of vias penetrating the porous, ceramic anode for carrying a fuel and a second plurality of vias penetrating the porous, ceramic anode for carrying an oxidant, the first plurality of vias having sidewalls allowing the fuel to infiltrate the porous, ceramic anode while the second plurality of vias having sidewalls being sealed so that the oxidant does not infiltrate the porous, ceramic anode;
    a solid electrolyte adjacent to the porous, ceramic anode and having a first plurality of vias penetrating the solid electrolyte for carrying a fuel and a second plurality of vias penetrating the solid electrolyte for carrying an oxidant, the solid electrolyte being gas-tight and having no more than about 5 volume percent porosity;
    a porous, ceramic cathode adjacent to the solid electrolyte and having a first plurality of vias penetrating the porous, ceramic cathode for carrying a fuel and a second plurality of vias penetrating the porous, ceramic cathode for carrying an oxidant, the second plurality of vias having sidewalls allowing the oxidant to infiltrate the porous, ceramic cathode while the first plurality of vias having sidewalls being sealed so that the fuel does not infiltrate the porous, ceramic cathode; and
    a ceramic interconnect adjacent to the porous, ceramic cathode and having a first plurality of vias penetrating the ceramic interconnect for carrying a fuel and a second plurality of vias penetrating the ceramic interconnect for carrying an oxidant, the ceramic interconnect being gas-tight and having no more than about 5 volume percent porosity; and
    at least one patterned feature on at least one of the porous, ceramic anode; ceramic electrolyte; porous, ceramic cathode; and ceramic interconnect for laterally distributing the fuel or oxidant; wherein the first and second plurality of vias in each of the porous, ceramic anode; solid electrolyte; porous, ceramic cathode; and ceramic interconnect, and the at least one patterned feature cooperate to form separate fuel and oxidant passageways through the SOFC.

12. The SOFC of claim 11 wherein the at least one patterned feature comprises a channel for distributing the fuel or oxidant.

13. The SOFC of claim 12 wherein the channel extends radially from at least one of the first or second plurality of vias.

14. The SOFC of claim 12 wherein there are a plurality of channels that extends radially from at least one of the first or second plurality of vias.

15. The SOFC of claim 11 further comprising a connector to connect the cell to an external fuel or oxidant outlet or inlet, the connector comprising a spring-loaded convex connector mating with a concave cavity on the SOFC.

16. The SOFC of claim 15 wherein the connector conducts current into and out of a SOFC.

17. A method of making an SOFC, comprising the steps of:

forming at least one layer of unsintered ceramic material, the ceramic material chosen for use as an anode of an SOFC;

punching a first plurality of through holes in the unsintered layer of anode material, wherein after sintering, the first plurality of through holes having sidewalls which are not sealed;

embossing the unsintered layer of anode material at predetermined locations and then punching at the predetermined locations to form a second plurality of through holes, wherein after sintering, the second plurality of through holes having sidewalls which are sealed;

forming at least one layer of unsintered ceramic material, the ceramic material chosen for use as an electrolyte of an SOFC punching first and second plurality of through holes in the unsintered layer of electrolyte material, wherein after sintering, the first and second plurality of through holes having sidewalls which are sealed;

forming at least one layer of unsintered ceramic material, the ceramic material chosen for use as a cathode of an SOFC;

embossing the unsintered layer of cathode material at predetermined locations and then punching at the predetermined locations to form a first plurality of through holes, wherein after sintering, the first plurality of through holes having sidewalls which are sealed;

punching a second plurality of through holes in the unsintered layer of cathode material, wherein after sintering the second plurality of vias having sidewalls which are not sealed;

forming at least one layer of unsintered ceramic material, the ceramic material chosen for use as an interconnect of an SOFC;

punching first and second plurality of through holes in the unsintered layer of interconnect material, wherein after sintering, the first and second plurality of through holes having sidewalls which are sealed;

stacking and laminating the anode, electrolyte, cathode and interconnect layers into an SOFC unsintered laminate wherein the first plurality of through holes and second plurality of through holes, respectively, in the anode, electrolyte, cathode and interconnect layers cooperate to form passageways; and sintering the SOFC unsintered laminate in a neutral or reducing atmosphere to result in an SOFC.

18. The SOFC of claim 17 wherein in the steps of embossing, additional unsintered ceramic material is screened into the embossed areas prior to punching.

19. The SOFC of claim 17 further comprising the step, prior to stacking and laminating, of embossing at least one channel in at least one of the anode, electrolyte, cathode and interconnect layers.

20. The SOFC of claim 17 further comprising the step, prior to stacking and laminating, of embossing at least one channel in all of the anode, electrolyte, cathode and interconnect layers.

21. The SOFC of claim 19 wherein the channel extends radially from at least one of the first or second plurality of vias.

22. The SOFC of claim 19 wherein there are a plurality of channels that extend radially from at least one of the first or second plurality of vias.

* * * * *